UNITED STATES PATENT OFFICE.

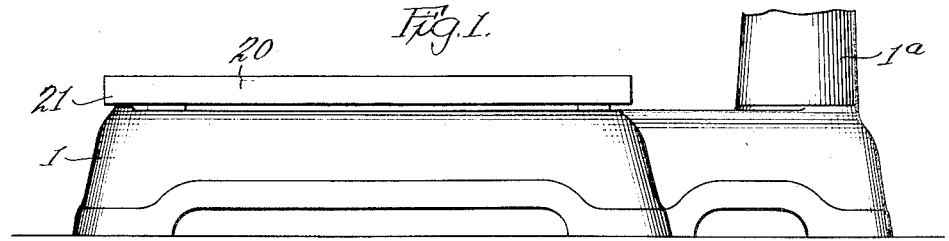
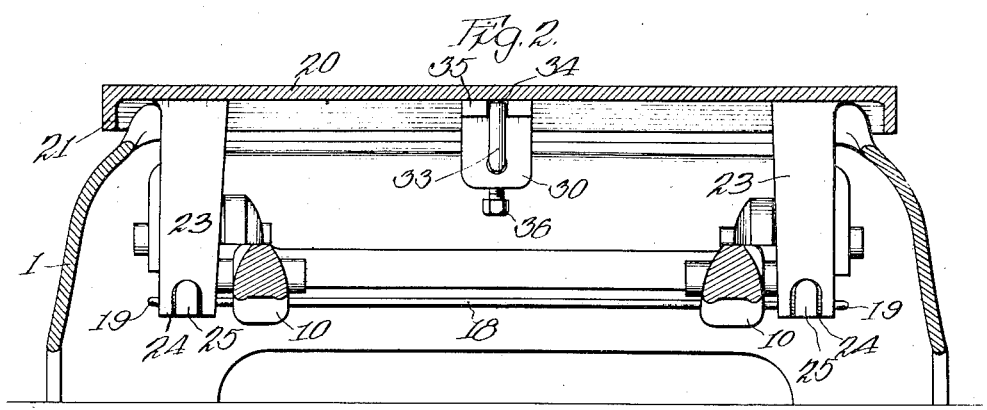
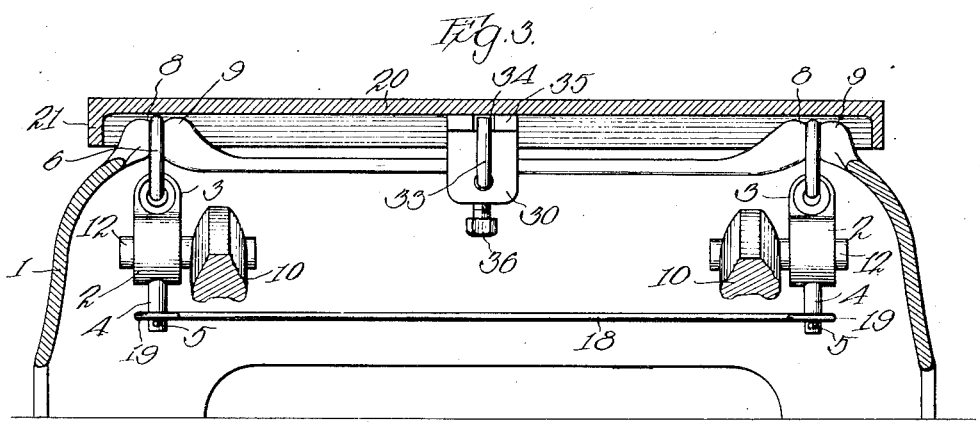
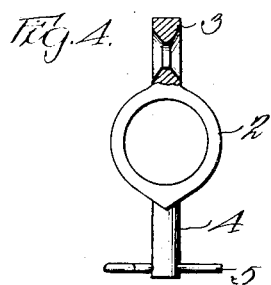

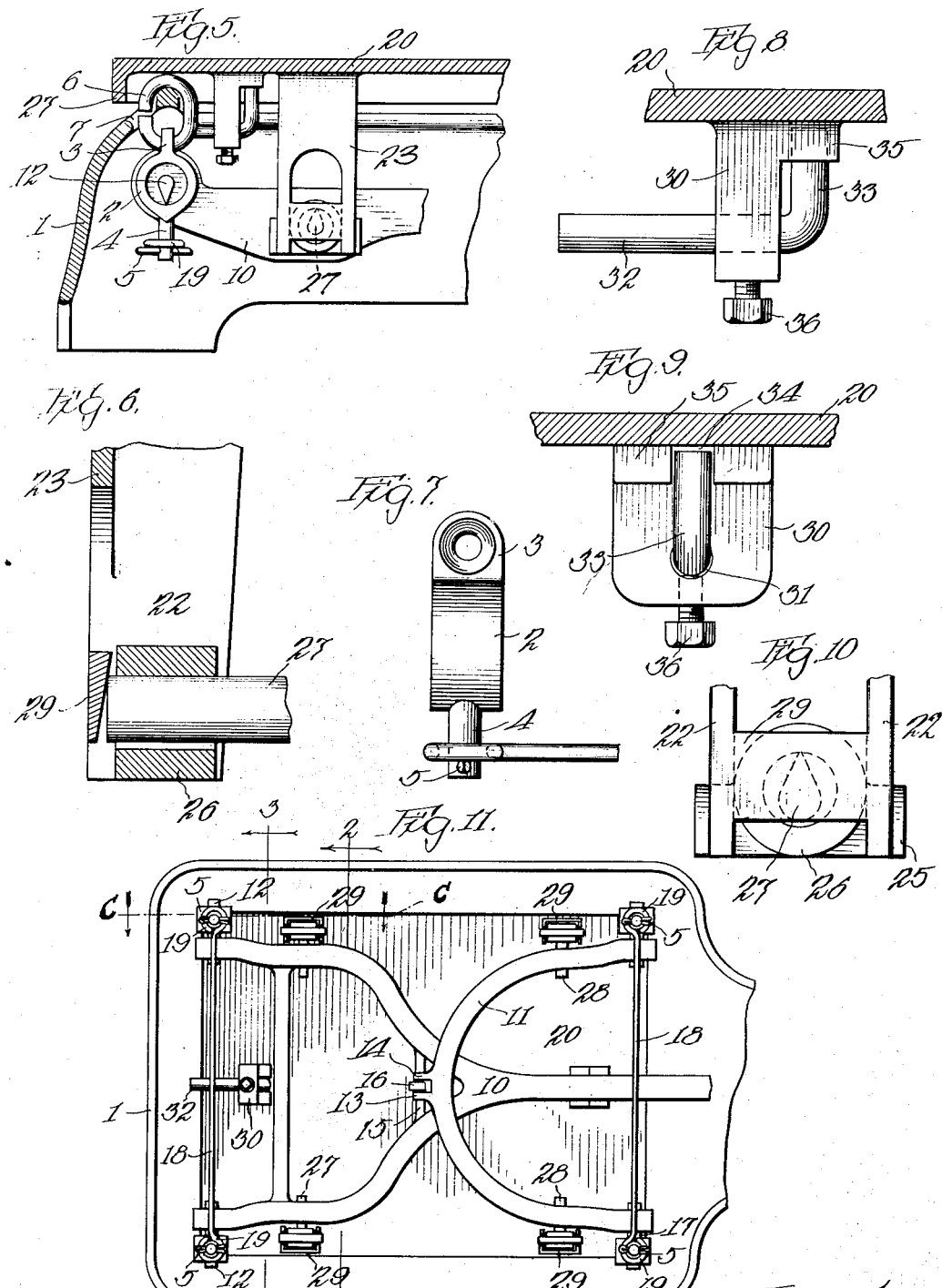

JOSEPH PAUPA AND GUSTAV F. HOCHRIEM, OF CHICAGO, ILLINOIS.

WEIGHING-SCALE.

1,177,892.  Specification of Letters Patent.  Patented Apr. 4, 1916.

Application filed May 21, 1915.  Serial No. 29,463.

*To all whom it may concern:*

Be it known that we, JOSEPH PAUPA and GUSTAV F. HOCHRIEM, citizens of the United States, residing at 3153 Broadway, in the city of Chicago, county of Cook, and State of Illinois, have invented certain new and useful Improvements in Weighing-Scales, of which the following is a specification.

Our invention relates to improvements in weighing scales and more particularly to the scale platform and the means employed to connect the same to the scale mechanism.

The main objects of our invention are to construct the mechanism within the scale base so as to eliminate the necessity of employing check rods or similar connections, to prevent side friction between the platform and base, to make provision for automatically centering the platform with respect to the base, to absolutely obviate any tendency of the knife edge rock bars or pivots becoming laterally displaced or shifted in their supporting bearings, and to lock the platform to the scale base against removal therefrom without interfering with the movement of said platform necessary to the weighing action.

The above and other objects we accomplish as fully set forth in the following specification and as particularly pointed out in the appended claims, reference being had to the accompanying drawings in which a preferred adaptation of our invention is shown.

In the drawings: Figure 1, represents a side elevation of the base and weighing platform of a weighing scales provided with our improvements, also a short fragment of the vertical standard situated at one end of the base. Fig. 2, is a transverse vertical section taken on line 2—2 Fig. 11 through the base, platform and mechanism connected thereto. Fig. 3, is a transverse vertical section taken on line 3—3 Fig. 11, through the base, platform and mechanism connected thereto. Fig. 4, is an enlarged detached detail view partly in section of one of the tubular hanging bearing blocks. Fig. 5, is an enlarged fragmentary view taken on line C—C, Fig. 11, through the base, platform and mechanism. Fig. 6, is an enlarged fragmentary view of one of the legs partly in vertical section to illustrate the stops connected to the legs. Fig. 7, is an enlarged detached edge elevation of the bearing block shown in Fig. 4, and also showing a fragment of one of the transverse connecting rods for coupling the blocks in pairs. Fig. 8, is an enlarged fragmentary view partly in section to illustrate one of the pins for securing the platform against removal. Fig. 9, is a view similar to Fig. 8, taken at a right angle thereto. Fig. 10, is a fragment of the lower portion of one of the platform legs with a tubular bearing in proper position therein and also showing the concealed portions of the bearing and the knife edge in dotted lines. Fig. 11, is a bottom plan view of the base of the scales with a portion thereof broken away at one end, and the movable portion of the weighing mechanism in proper assembled position therein.

In referring to the drawings in detail like numerals designate corresponding parts.

The base 1, is of a conventional flanged form and is provided with a top rectangular shaped opening. Four tubular bearing blocks are suspended or hung from the top of the base being located at the four corners of the rectangular opening therein as shown in Fig. 11. Each of these bearing blocks we prefer to construct in substantially the form shown in Figs. 4 and 7, which consists of a central tubular bearing 2, a vertical upstanding eye 3, and a depending pin 4. The pin 4, it will be noted has a transverse opening near its lower end through which a split spring pin 5, is removably fitted for a purpose to be hereinafter described. The bearing blocks are hung or suspended in position by means of a link or ring 6, which fits through an opening 7, in the upper corner of the base and around a groove 8 in a raised portion 9, adjacent to said opening 7, and also through the eye 3, in the block as shown in Fig. 5.

In the adaptation of our invention herein shown the weighing levers comprise a long upper substantially Y-shaped lever 10, and a lower and shorter U-shaped lever 11. The Y-shaped lever has the outer extremity of its stem connected in the usual and well known manner to the scale beam or weight indicating mechanism (not shown) and the extremities of the bifurcated portions thereof are provided with outwardly extending transverse knife edges 12, which seat loosely and rock in the tubular bearings 2, of the two bearing blocks located at the end of the base, opposite the vertical standard 1ᵃ as shown more particularly in Figs. 1 and 5.

The U-shaped lever 11, is provided near its middle with a small forked portion 13, through the members of which a transverse pin 14, is fitted. A short transverse bar, 15, extends between the bifurcated portions of the Y-shaped lever near their junction with the stem of said lever and a link or ring 16, is fitted around the pin 14 and bar 15, to loosely secure the two levers together, see Fig. 11.

The ends of the U-shaped lever are provided with outwardly extending transverse knife edges 17, similar to the knife edges 12, previously described which project loosely within and rock in the tubular bearings 2, of the two other bearing blocks, located in proximity to the vertical standard, 1ª, as shown in Fig. 11.

The tubular bearing blocks are connected together in transverse pairs by means of transverse connecting or tie rods 18, the ends of the rods preferably being provided with loops or eyes 19, through which the pins 4 are fitted and the loops being held thereon by the spring split pins 5, previously described.

In the adaptation shown, the weighing platform 20, is of a flat plate like form with a depending surrounding flange 21, which fits over the upper portion of the base when the platform is properly mounted thereon substantially as shown in Fig. 5. Four legs depend from the platform being arranged on the undersurface of the platform and approximately at the four corners of a rectangle slightly smaller in width and length than the rectangular opening in the base, so that said legs will fit through said opening and in proximity to the side walls thereof, near the corners as shown in Fig. 11. We prefer to form the legs as shown in Figs. 2, 5, 6 and 10, in which two end portions 22, in parallel vertical separated arrangement are connected at one side edge by a side portion 23. The lower ends of the portions 22 are provided with a recess or seat 24 in which the oppositely projecting extensions 25 of tubular bearing blocks 26, loosely fit, see Figs. 5 and 10.

The Y-shaped lever 10 is provided with outwardly extending transverse knife edges 27, located on the bifurcated portions thereof and a short distance inwardly from the knife edges 12, which project loosely within and rock in the tubular bearing blocks 26, arranged in the legs at one end of the platform and corresponding knife edges 28, extend transversely outward from the U-shaped lever 11, at points a short distance inwardly from the knife edges 17, and loosely seat and rock in the bearing blocks 26, mounted in the legs at the opposite end of the platform.

To prevent any lateral shifting of the rock bars 27 and 28 in the tubular bearings we prefer to extend transverse horizontal plates 29, bridging the space between the outer end portions of the legs which project in front of the tubular bearing opening and form stops against which the outer ends of the rock bars contact substantially as shown in Figs. 6 and 10. This not only prevents lateral movement of the knife edges but it also assists in centering the platform with respect to the scale base and in conjunction with the connecting rods, 18, automatically maintains the said platform in centered position and returns it to its central position automatically when moved therefrom.

We prefer to loosely lock the platform to the base in such manner that it will not interfere in any way with the slight vertical movement of said platform necessary to the weighing action. The mechanism we prefer to utilize for this purpose is shown more particularly in Figs. 8 and 9, and consists of a lug 30, depending from the scale platform and provided with a horizontal opening 31, and a locking pin 32 slidably fitted through said opening. The locking pin 32, is adapted to be moved outwardly to project beneath a portion of the base top as shown in Fig. 11, and thus loosely secure the platform to the base. As shown the pin is provided with a bent inner end 33, which extends at a right angle to the pin proper and is adapted to fit in a recess 34, in an inner reduced portion 35, of the lug to prevent rotation of the pin when in locking position. The pin is secured in its position by a set screw 36, fitted in the lower end of the lug 30.

It will be noted that our improved mechanism dispenses with the check rods or other connections usually employed, couples the tubular bearings in pairs, prevents lateral shifting and automatically returns and normally maintains the platform in centered position with respect to the base.

While we have illustrated and described preferred forms of construction for carrying our invention into effect, this is capable of a wide range of variation, alteration, modification and change without departing from the spirit of our invention, we therefore do not wish to be limited to the construction herein shown and described, but desire to avail ourselves of all such variations, alterations, modifications and changes as fairly fall within the scope of the appended claims or may be construed to be within the scope thereof by involving the doctrine of equivalents.

What we claim as our invention and desire to secure by Letters Patent is:

1. In a weighing scales, the combination of a base, bearing blocks hung from said base, levers fulcrumed in said bearing blocks, a platform supported from said levers, and means for coupling the bearing blocks in pairs.

2. In a weighing scales, the combination of a base, bearing blocks hung from said base, levers fulcrumed in said bearing blocks, a platform supported from said levers, and transverse connecting rods for coupling the bearing blocks in pairs.

3. In a weighing scales, the combination of a base having an opening, bearing blocks hung from said base, levers fulcrumed in said bearing blocks, a scale platform having depending legs fitting through the opening in the base, bearings arranged in said legs, knife edges extending from the levers and loosely fitted in the bearing blocks and the bearings arranged in the legs and means for coupling the bearing blocks in transverse pairs.

4. In a weighing scales, the combination of a base having an opening, bearing blocks hung from said base, levers fulcrumed in said bearing blocks, a scale platform having depending legs fitted through the opening in the base, bearings arranged in said legs, knife edges extending from the levers and loosely fitted in the bearing blocks and the bearings arranged in the legs and connecting rods for coupling the bearing blocks in transverse pairs.

5. In a weighing scales, the combination of a base, having an opening, bearing blocks hung from said base, each of said bearing blocks having a tubular bearing, an upstanding eye and a depending pin, levers fulcrumed in said bearing blocks, a scale platform having depending legs fitting through the opening in the base, bearings arranged in said legs, knife edges extending from the levers and loosely fitted in the bearing blocks and the bearings arranged in the legs, and means for coupling the bearing blocks in transverse pairs.

6. In a weighing scales, the combination of a base, bearing blocks hung from said base and having depending pins, levers fulcrumed in said bearing blocks, a platform supported from said levers, and means connected to the depending pins for coupling the bearing blocks in pairs.

7. In a weighing scales, the combination of a base, bearing blocks hung from said base and having depending pins, levers fulcrumed in said bearing blocks, a platform supported from said levers, and transverse connecting rods for coupling the bearing blocks in pairs; said rods having loops through which the depending pins of said blocks are fitted.

8. In a weighing scales, the combination of a base, bearing blocks hung from said base and having depending pins, levers fulcrumed in said bearing blocks, a platform supported from said levers, and transverse connecting rods for coupling the bearing blocks in pairs; said rods having loops through which the depending pins of said blocks are fitted, and split pins fitted transversely through openings in the depending pins for securing said loops thereon.

9. In a weighing scales, the combination with a base having an opening, a platform arranged over said opening, legs depending from said platform and extending through said opening in the base, levers suspended within the base and having knife edges supported from the legs of the platform and means for preventing lateral movement of said rock bars in said legs.

10. In a weighing scales, the combination with a base having an opening, a platform arranged over said opening, legs depending from said platform and extending through said opening in the base, levers suspended within the base and having knife edges supported from the legs of the platform and stop plates attached to the legs for preventing lateral movement of said rock bars in said legs.

11. In a weighing scales, the combination with a base having an opening, a platform arranged over said opening, legs depending from said platform and extending through said opening in the base, levers suspended within the base and having knife edges supported from the legs of the platform and stop plates attached to the sides of the legs for preventing lateral movement of said rock bars in said legs.

12. In a weighing scales, the combination with a base, having an opening, a platform arranged over said opening, legs depending from said platform and extending through said opening in the base, each of said legs comprising two parallel vertical end portions and a connecting side portion, said end portions having bottom recesses, bearings in said recesses, levers suspended from the base, knife edges extending from said levers and loosely fitting in the bearings in the recesses of the legs, and means for preventing lateral movement of said rock bars in said bearings.

13. In a weighing scales, the combination with a base having an opening, a platform arranged over said opening, legs depending from said platform and extending through said opening in the base, each of said legs comprising two parallel vertical end portions and a connecting side portion said end portions having bottom recesses, bearings in said recesses, levers suspended from the base, knife edges extending from said levers and loosely fitting in the bearings in the recesses of the legs and stop plates for preventing lateral movement of said rock bars in said bearings.

14. In a weighing scales, the combination with a base having an opening, a platform arranged over said opening, legs depending from said platform and extending through said opening in the base, each of said legs comprising two parallel vertical end portions and a connecting side portion, said end portions having bottom recesses, bearings in said recesses, levers suspended from the base, knife edges extending from said levers and loosely fitting in the bearings in the recesses of the legs, and stop plates extending across the recesses of the outer end portions of the legs for preventing lateral movement of said rock bars in said bearings.

15. In a weighing scales, the combination with a base, and a weighing platform on said base, of means for loosely securing said platform to said base including a lug depending from the platform, and a locking pin slidably mounted in said lug and adapted to be projected beneath a portion of the base.

16. In a weighing scales, the combination with a base, and a weighing platform on said base, of means for loosely securing said platform to said base including a lug depending from the platform, a locking pin slidably mounted in said lug and adapted to be projected beneath a portion of the base, and means for securing said pin in its adjusted position.

17. In a weighing scales, the combination with a base, and a weighing platform on said base, of means for loosely securing said platform to said base including a lug depending from the platform, a locking pin slidably mounted in said lug and adapted to be projected beneath a portion of the base, and a set screw for securing said pin in its adjusted position.

In testimony whereof we have hereunto affixed our names in the presence of two witnesses.

JOSEPH PAUPA.
GUSTAV F. HOCHRIEM.

Witnesses:
ROBT. KLOTZ,
GUS. WOLLTERS.